United States Patent
Chan

(10) Patent No.: US 9,159,975 B2
(45) Date of Patent: Oct. 13, 2015

(54) RECHARGEABLE BATTERY MODULE

(71) Applicant: Go-Tech Energy Co., Ltd., New Taipei (TW)

(72) Inventor: Wan-Sheng Chan, Keelung (TW)

(73) Assignee: Go-Tech Energy Co. Ltd., New Taipei (TW)

( * ) Notice: Subject to any disclaimer, the term of this patent is extended or adjusted under 35 U.S.C. 154(b) by 123 days.

(21) Appl. No.: 14/097,404

(22) Filed: Dec. 5, 2013

(65) Prior Publication Data

US 2015/0162581 A1 Jun. 11, 2015

(51) Int. Cl.
*H01M 2/10* (2006.01)
*H01M 10/6555* (2014.01)
*H01M 10/42* (2006.01)
*H01M 10/613* (2014.01)
*H01M 10/625* (2014.01)

(52) U.S. Cl.
CPC ........ *H01M 2/1094* (2013.01); *H01M 10/5055* (2013.01); *H01M 2/1077* (2013.01); *H01M 10/613* (2015.04); *H01M 10/625* (2015.04); *H01M 2010/4271* (2013.01); *H01M 2220/20* (2013.01)

(58) Field of Classification Search
CPC ............ H01M 2/1077; H01M 10/613; H01M 2220/20; H01M 10/625; H01M 2010/4271; H01M 2/1094; H01M 10/5055
See application file for complete search history.

(56) References Cited

U.S. PATENT DOCUMENTS

| | | | |
|---|---|---|---|
| 6,465,123 B1 * | 10/2002 | Baumann et al. ............... | 429/99 |
| 8,114,537 B2 * | 2/2012 | Kang et al. ...................... | 429/96 |
| 8,530,069 B2 * | 9/2013 | Wood et al. ..................... | 429/99 |
| 8,603,660 B2 * | 12/2013 | Houchin-Miller et al. ... | 429/120 |
| 8,722,225 B2 * | 5/2014 | Kim et al. ........................ | 429/99 |
| 8,999,538 B2 * | 4/2015 | Fuhr et al. ....................... | 429/56 |
| 9,017,855 B2 * | 4/2015 | Park et al. ..................... | 429/151 |
| 2012/0021260 A1 * | 1/2012 | Yasui et al. ..................... | 429/53 |

* cited by examiner

*Primary Examiner* — Stewart Fraser
(74) *Attorney, Agent, or Firm* — Che-Yang Chen; Law Office of Michael Chen

(57) ABSTRACT

A rechargeable battery module is disclosed. The rechargeable battery module includes a number of rechargeable battery cells, two end portion fixing structures, a middle fixing structure, a number of thermal bars, a bolt and a nut. The two end portion fixing structures are positioned in opposite directions. The bolt passes one end portion fixing tube, middle fixing structure and the other end portion fixing tube and fixes the rechargeable battery module by linking with the nut.

9 Claims, 7 Drawing Sheets

RECHARGEABLE BATTERY MODULE

FIELD OF THE INVENTION

The present invention relates to a rechargeable battery module. More particularly, the present invention relates to a rechargeable battery module having fixing structures and heat dissipating function.

BACKGROUND OF THE INVENTION

Rechargeable batteries are widely used in many products, such as notebooks, tablets, mobile phones, and even large electric vehicles and robots. Since space in the aforementioned devices is limited. How to arrange the rechargeable battery set (battery cells) and prevent them from coming off due to vibration to ensure heat dissipating can be effectively operated is a problem for engineers to take care of for individual case any time.

Review the prior arts, there are many techniques can be applied. Please refer to FIG. 1. The U.S. Pat. No. 6,465,123 discloses a box type rechargeable battery module 1. It is composed of a bottom plate 11 and several fixing structure 12. The fixing structure 12 includes a number of semi-circular structures formed to one another. The semi-circular structure can just accommodate a half of rechargeable battery cell 20. There are corresponding semi-circular structures on the bottom plate 11. The semi-circular structure of the fixing structure 12 can combine that of the bottom plate 11 to fix several rechargeable battery cells 20. In addition, two semi-circular structures of the fixing structure 12 can also combine to fix other rechargeable battery cells 20, Thus, multi-layer rechargeable battery cell 20 are composed to be a main part of the battery module 1. Finally, a cover (not shown) will be fixed with the bottom plate 11. The battery module 1 is formed. Many battery modules are manufactured by similar means as disclosed in the present invention. However, an obvious defect is that such structure needs different toolings are required according to different applied subjects (devices). As far as the cost is concerned, it is not economic. Meanwhile, cooling effect is limited.

As shown in FIG. 2, a battery module 3 is also provided in another prior art. It includes: a first battery bracket 31, a second battery bracket 32 and a liquid cooling module 33. Each battery bracket 31 and 32 has a number of hollowed accommodating portion 34 to accommodate a number of battery units 40, correspondingly. The liquid cooling module 33 includes: an entrance channel 331, an outlet channel 332, a channel board 333 having a channel and a first connecting member 334 and a second connecting member 335 linked to opposite sides of the channel board 333. The first battery bracket 31 and the second battery bracket 32 can be stacked to each other. The channel board 333 is installed between the first battery bracket 31 and the second battery bracket 32 with two opposite sides fixed by the first connecting member 334 and second connecting member 335, respectively. After a cooling liquid comes from the entrance channel 331, it flows to the channel of the channel board 333. The heat generated by the battery unit 40 in the battery brackets 31 and 32 can be taken away and conducted to the second connecting member 335 on the other side. Then, the cooling liquid flows out from the outlet channel 332.

The aforementioned battery module 3 definitely can conduct the heat generated by the battery unit 40 in operation out of the battery module 3 fast and efficiently due to the design of the liquid cooling module 33. But since it needs an extra structure, the liquid cooling module 33, cost of constructing the battery module 3 is high. It is time consumptive to assemble.

Therefore, a rechargeable battery module having low cost, being easily assembled, operating with efficient heat dissipation and able to fix the internal battery cells, is still desired.

SUMMARY OF THE INVENTION

The known rechargeable battery modules have problems of heat dissipation and higher cost. In addition, in order to fix the rechargeable battery cells inside and enhance heat dissipation, assembly of the rechargeable battery module becomes very inconvenient.

Hence, rechargeable battery modules having low cost, being easily assembled, operating with efficient heat dissipation and able to fix the internal battery cells is desired. The rechargeable battery module according to the present invention fulfills the features mentioned above.

According to an aspect of the present invention, a rechargeable battery module includes: a number of rechargeable battery cells, each having identical appearance, arranged in the same direction, and connected to each other in series or parallel for providing power; two end portion fixing structures, each including: a number of end portion accommodating sections, formed in the same plane, each end portion accommodating section comprising at least one limiting structure, disposed at an end of the end portion accommodating section for accommodating one end of the rechargeable battery cell and limiting movement of the rechargeable battery cell not to go beyond the limiting structure; and an end portion fixing tube, formed among the end portion accommodating sections; a middle fixing structure, including: a number of hollow portions, formed in the same plane, a cross-sectional shape of each hollow portion is substantially similar with but a little larger than that of the rechargeable battery cell, for fixing the rechargeable battery cell; and a number of fixing grooves, each fixing groove formed in one side of the middle fixing structure; a number of thermal bars, each thermal bar fixed with at least one fixing groove, for conducting heat generated out from the rechargeable battery cells via the middle fixing structure; a bolt; and a nut. The two end portion fixing structures are positioned in opposite directions. The bolt passes one end portion fixing tube, middle fixing structure and the other end portion fixing tube and fixes the rechargeable battery module by linking with the nut. The rechargeable battery cells is fixed along an axial direction of the bolt by the limiting structures of the end portion accommodating sections in the two end portion fixing structures.

Preferably, an end of the end portion accommodating section has an opening to expose an electrode.

Preferably, the end portion fixing structure further includes a nut accommodating portion, for accommodating the nut when the bolt is linked to the nut.

Preferably, the middle fixing structure further includes a fixing hole, accommodating end portions of the two end portion fixing tubes, for fixing the two end portion fixing tubes.

Preferably, the end portion fixing structure is made by thermosetting plastic or metal material.

Preferably, the middle fixing structure is made by thermosetting plastic or metal material.

Preferably, a cross-sectional shape of the thermal bar is round, square or hexagonal.

Preferably, the thermal bar is made by metal or alloy.

Preferably, the metal is aluminum, brass or copper.

The rechargeable battery module provided by the present invention can efficiently dissipate heat during operation and fix the rechargeable battery cells inside, in case the rechargeable battery cells come off due to vibration. It is simple in using materials. Price is also cheap comparing with conventional rechargeable battery modules. Meanwhile, the rechargeable battery module is easily assembled and convenient to form a rechargeable battery module network by thermal bars.

DETAILED DESCRIPTION OF THE PREFERRED EMBODIMENT

The present invention will now be described more specifically with reference to the following embodiment.

Figure 1:
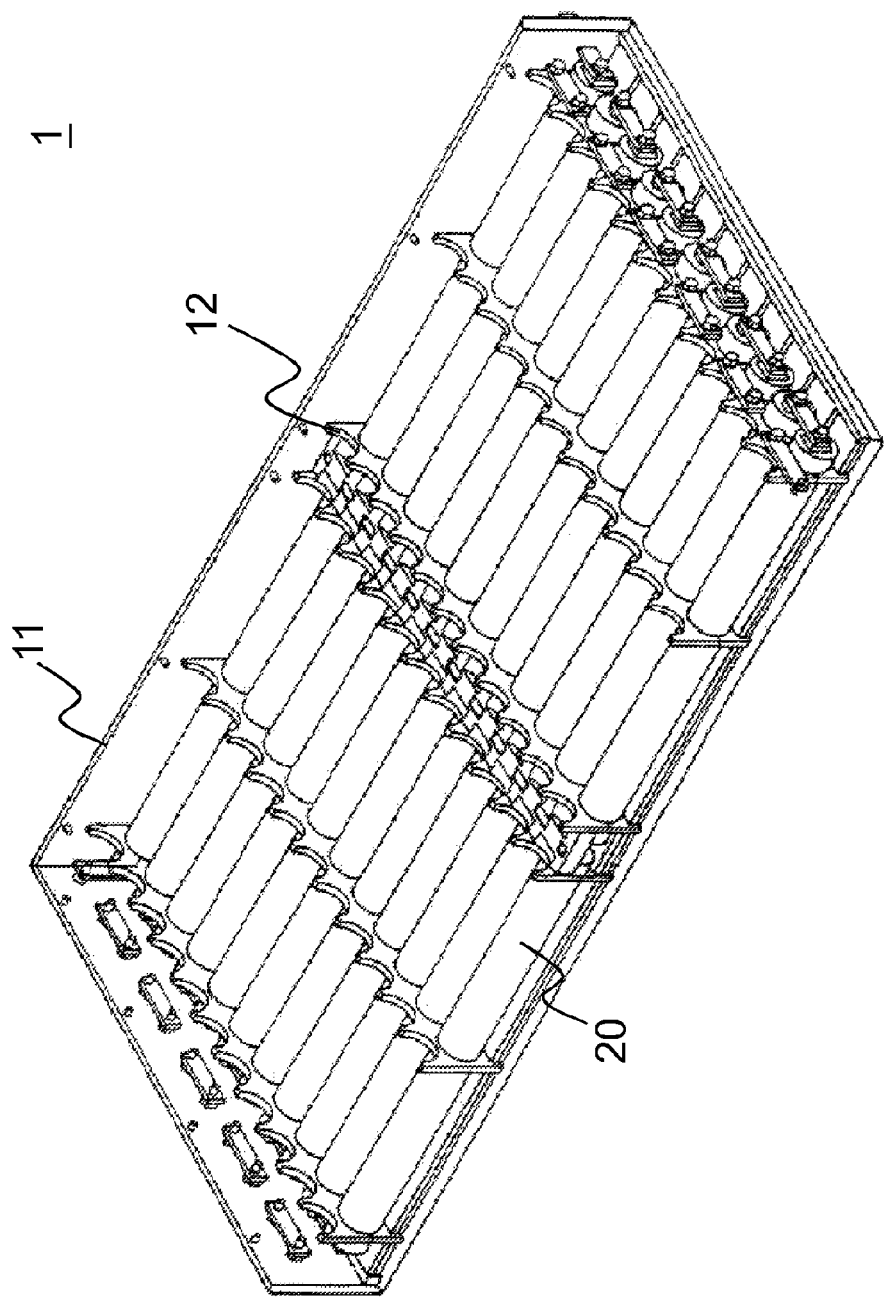
FIG. 1 is a perspective view of a prior art of a box type rechargeable battery module.
Figure 2:
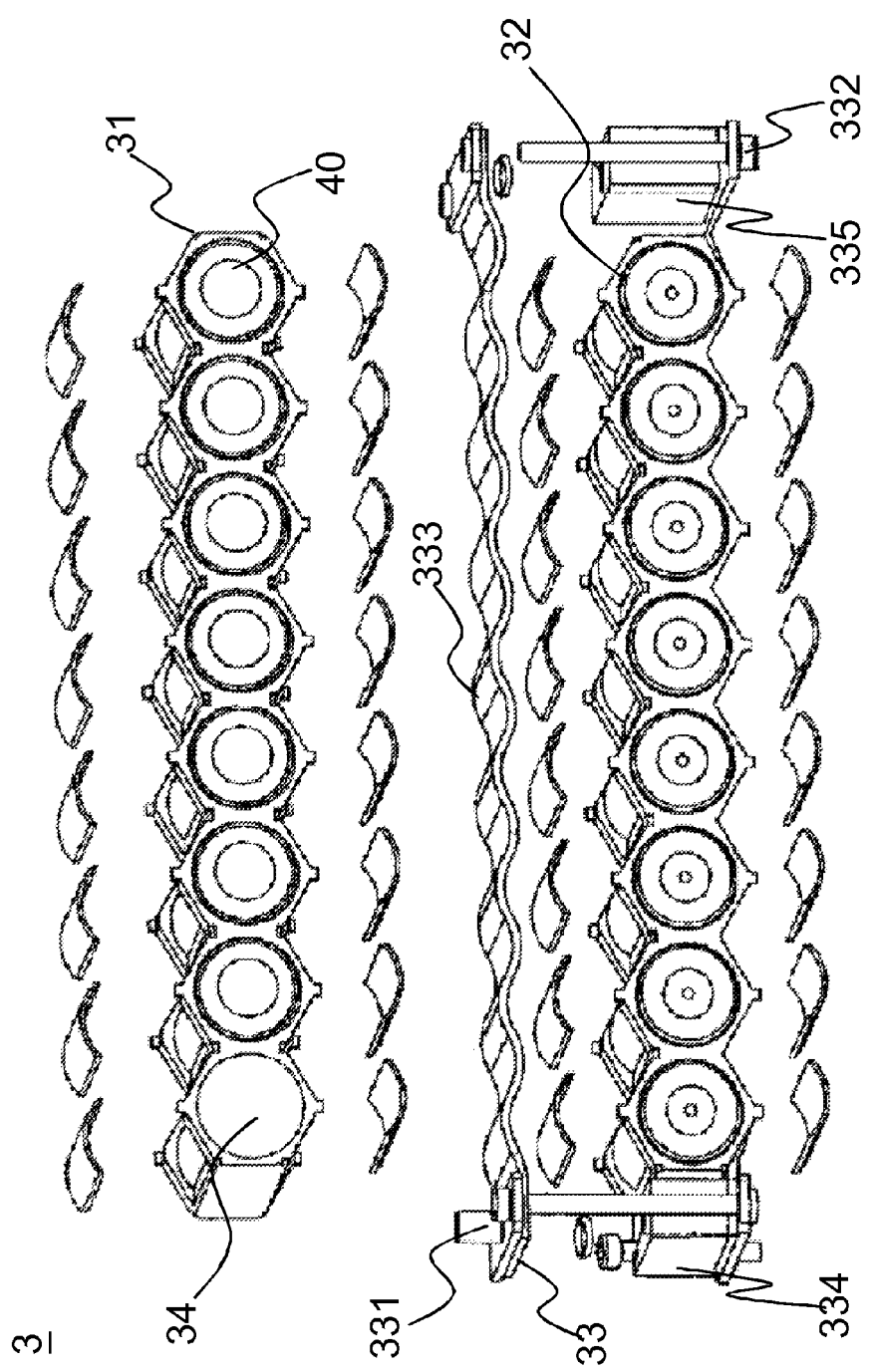
FIG. 2 is an exploded view of a prior art of a battery module.
Figure 3:
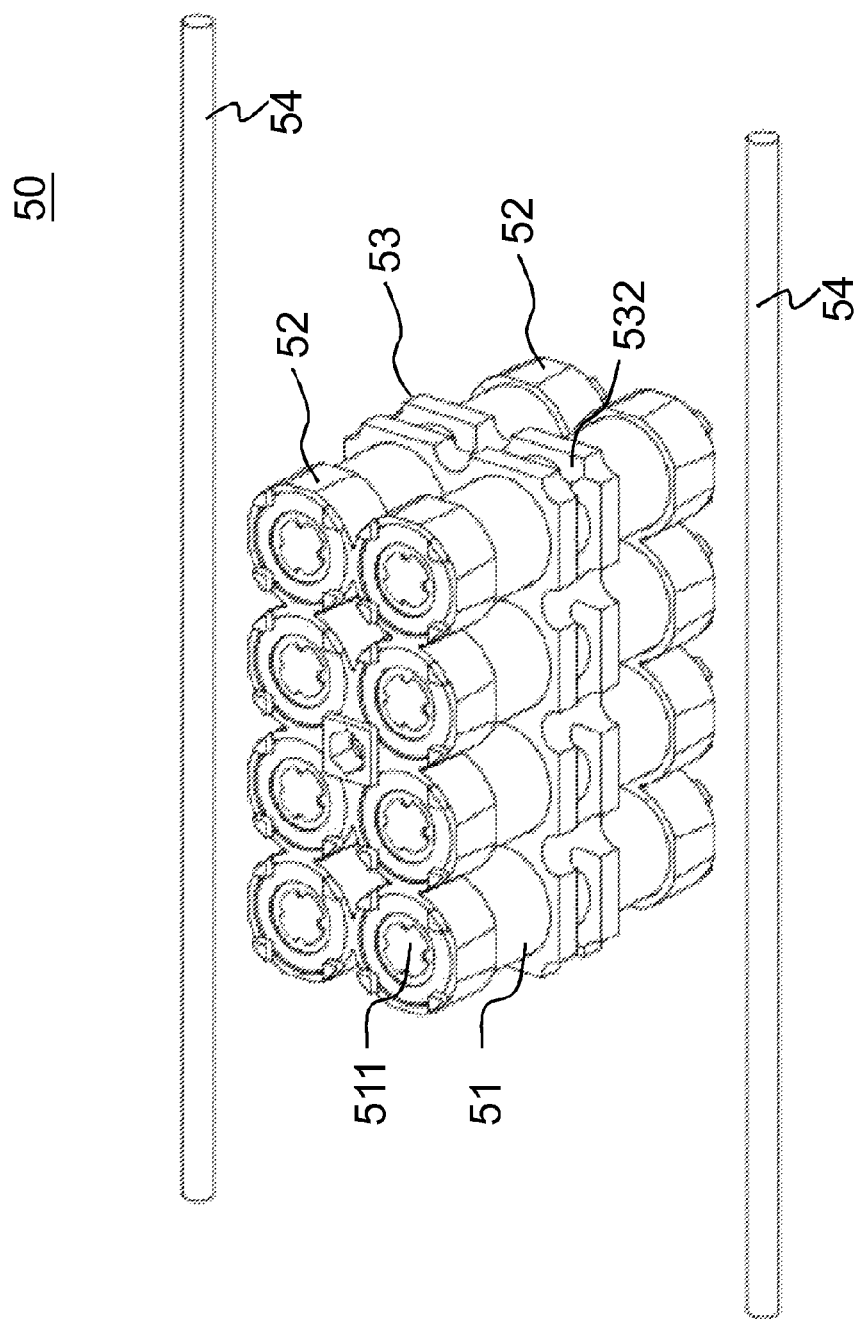
FIG. 3 is a perspective view of a rechargeable battery module according to the present invention.
Figure 4:
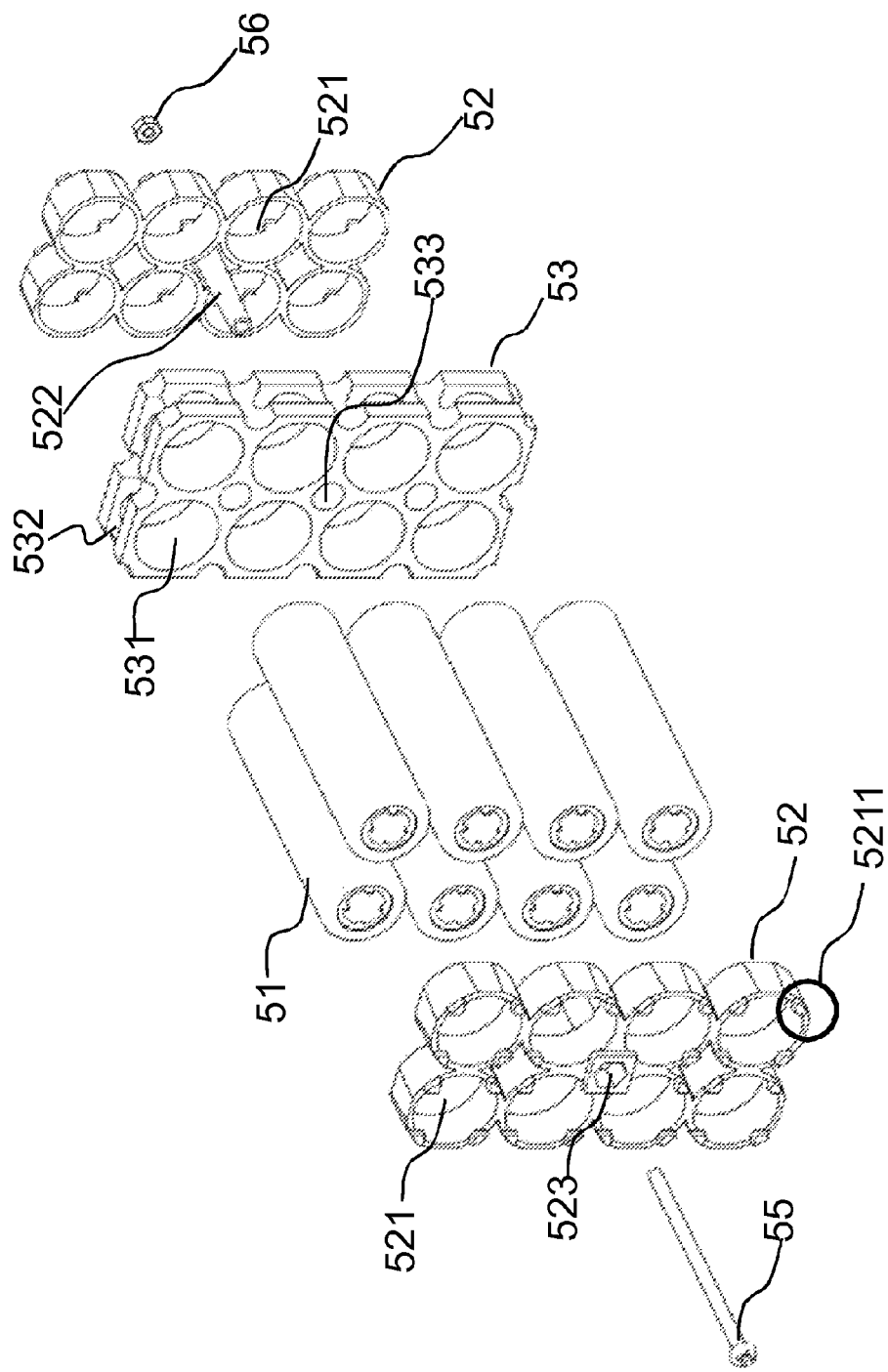
FIG. 4 is an exploded view of the rechargeable battery module.
Figure 5:
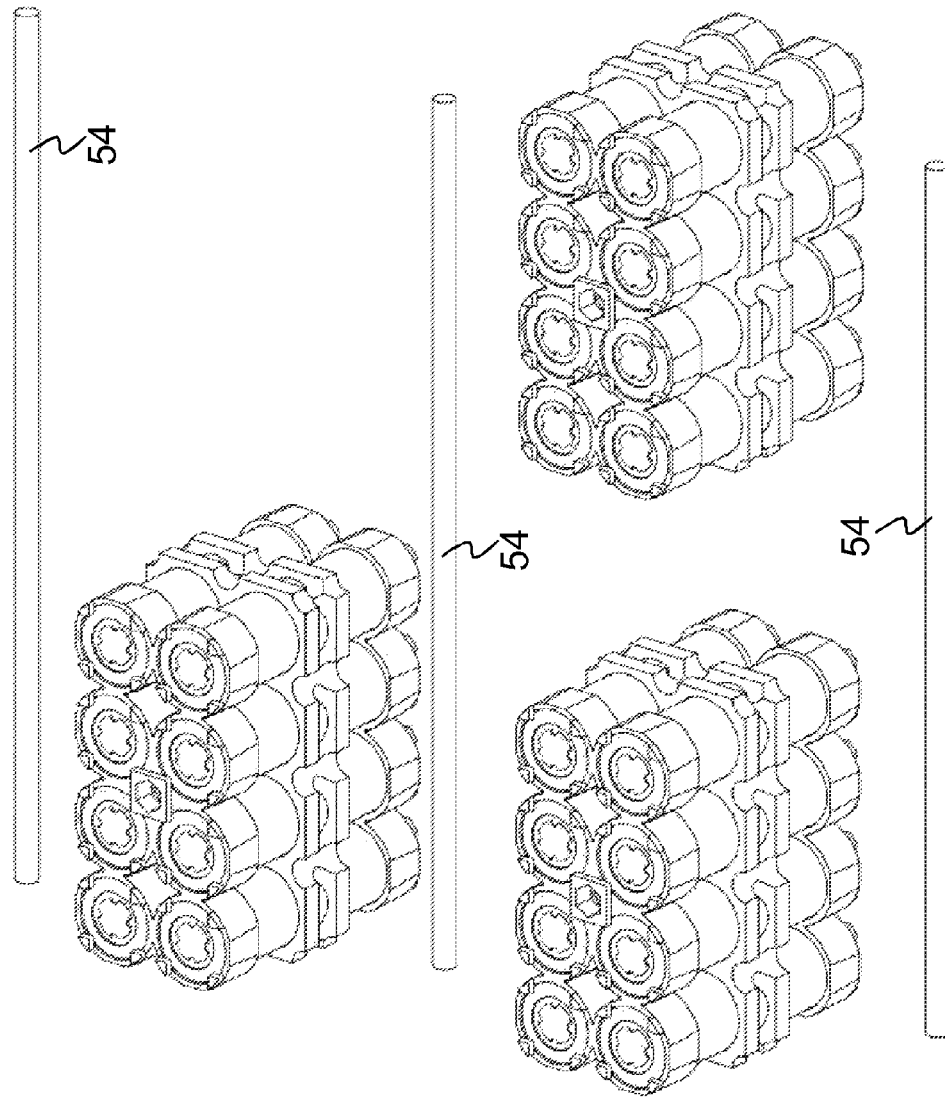
FIG. 5 shows a combination of the rechargeable battery module.
Figure 6:
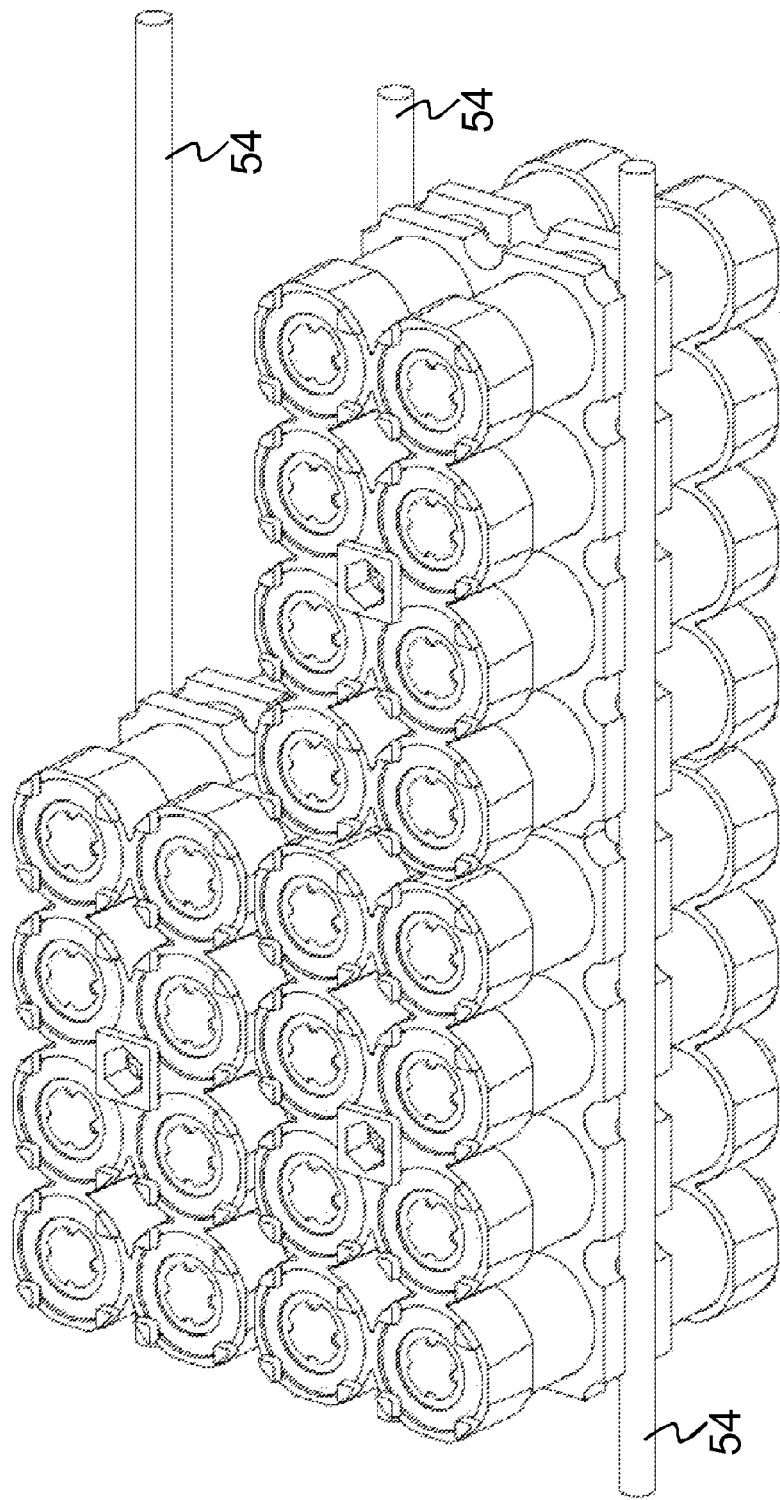
FIG. 6 is a perspective view of the combination.
Figure 7:
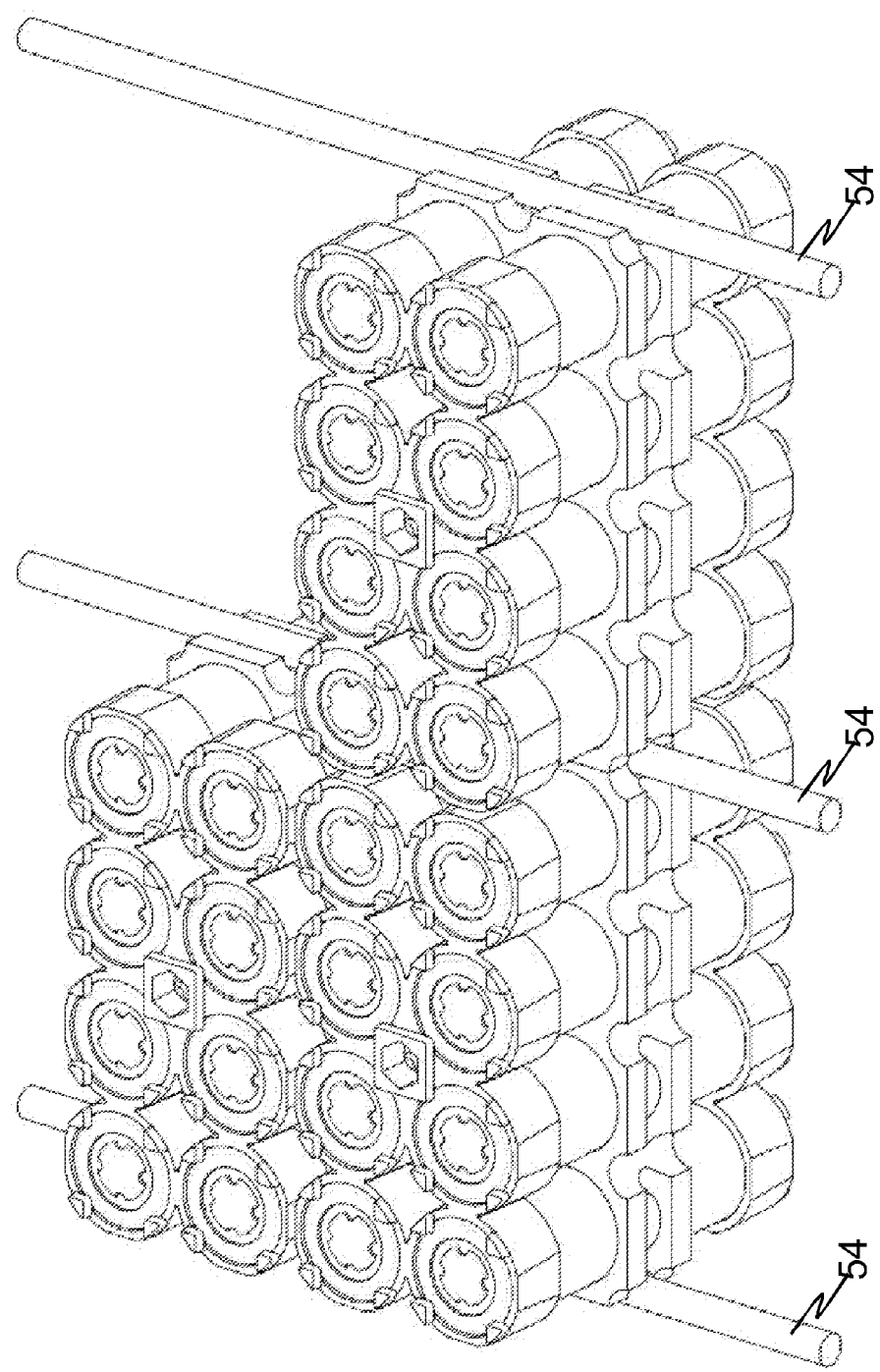
FIG. 7 is a perspective view of another combination of the rechargeable battery module.

Please refer to FIG. 3 to FIG. 7. FIG. 3 is a perspective view of a rechargeable battery module according to the present invention. FIG. 4 is an exploded view of the rechargeable battery module. FIG. 5 shows a combination of the rechargeable battery module. FIG. 6 is a perspective view of the combination. FIG. 7 is a perspective view of another combination of the rechargeable battery module.

A rechargeable battery module 50 may be composed with below items: eight rechargeable battery cells 51, two end portion fixing structures 52, a middle fixing structure 53, two thermal bars 54, a bolt 55 and a nut 56. It should be noticed that the present embodiment is designed according to a requirement of a specified power source. In practice, the rechargeable battery module 50 can have two or more rechargeable battery cells 51. The amount is not limited to eight.

The eight rechargeable battery cells 51 have identical appearance and are arranged in the same direction. An 18650 type lithium rechargeable battery is commonly used. As shown in FIG. 3, the rechargeable battery cells 51 are arranged in two rows with four units in a row. The arrangement is not limited to this. It can vary with the amount of rechargeable battery cells. For example, if the amount of the rechargeable battery cells is 16, the arrangement may be four rows with four units in a row. In design, it is better to arrange the rechargeable battery cells in the same plane in case of waste of space. The rechargeable battery cell 51 may be connected to each other in series or parallel to provide a specified power. Since the present invention does not relate to connecting methods of rechargeable battery cells. Any design of connecting method of the rechargeable battery cells 51 fulfilling the power requirement of a unit rechargeable battery pack is applicable. Therefore, connection of the rechargeable battery cells 51 is not shown in each drawing.

Each of the two end portion fixing structures 52 includes eight end portion accommodating sections 521, an end portion fixing tube 522 and a nut accommodating portion 523. The eight end portion accommodating sections 521 are formed in the same plane. Each end portion accommodating section 521 includes at least a limiting structure 5211 (shown by a circle marked in FIG. 4), formed in an end of the end portion accommodating section 521. The end portion accommodating section 521 is used to accommodate an end of the rechargeable battery cell 51. The limiting structure 5211 can further restrict movement of the rechargeable battery cell 51 not to go beyond the limiting structure 5211. An end of the end portion accommodating section 521 has an opening to expose an electrode 511 to facilitate electrical connection between the rechargeable battery cells 51. As illustrated in the present embodiment, the amount of limiting structures 5211 in the end of each end portion accommodating section 521 is four. According to the spirit of the present invention, the amount is not limited to four. Any amount can be used as long as it can reach the goal of limiting movement of the rechargeable battery cells 51.

The end portion fixing tube 522 is formed in the central portion among the eight end portion accommodating sections 521. Since the end portion fixing tube 522 is used to facilitate fixing of the bolt 55 and nut 56, it is better that the position of the end portion fixing tube 522 is at the planer centroid of the eight end portion accommodating sections 521 in case uneven distribution of stress. However, if the device the rechargeable battery module 50 applied to has some auxiliary designs, it is workable that the end portion fixing tube 522 is not set at the planer centroid of end portion accommodating sections 521. Also, according to the spirit of the present invention, the amount of the end portion fixing tubes 522 is not limited to one, as shown in the present embodiment. As long as the rechargeable battery modules 50 can be fixed, any number of end portion fixing tubes 522 can be set on the end portion fixing structure 52. It should be noticed that the amount of bolt 55 and nut 56 should increase accordingly. The nut accommodating portion 523 is used to accommodate the nut 56 while the bolt 55 and nut 56 is linked.

As to material, the end portion fixing structure 52 can be made by a thermosetting plastic or metal material. For the thermosetting plastic, Acrylonitrile Butadiene Styrene (ABS) is better; for the metal material, aluminum or aluminum alloy is preferred.

The middle fixing structure 53 includes eight hollow portions 531, twelve fixing grooves 532 and a fixing hole 533. The amount of the hollow portions 531 is the same as that of the rechargeable battery cells 531. Arrangement and locations are the same as that of the end portion accommodating section 521. The eight hollow portions 531 are formed in the same plane. A cross-sectional shape of each hollow portion 531 is substantially similar with but little larger than that of the rechargeable battery cell 51. Thus, the rechargeable battery cell 51 can be put into the hollow portion 531 exactly so that function of fixing is available. The rechargeable battery cell 51 may only move along an axial direction after it is put into the hollow portion 531.

It is clear from FIG. 3 and FIG. 4 that the each one of the fixing grooves 532 is formed on one side of the middle fixing structure 52. Since the shape of the middle fixing structure 53 is close to a rectangle, the arrangement of the fixing grooves 532 is four in the front side, four in the back side, two in the left side and two in the right side. Because the function of the fixing groove 532 is to fix the thermal bar 54, formation of the fixing groove 532 should be outermost location so as to contact the thermal bar 54. It should be notice that, according to the spirit of the present invention, the amount of the fixed thermal bar 54 on each side is not limited to one. For consideration of the whole stability and heat dissipation of the rechargeable battery module 50, two or more thermal bars 54 can be fixed in one side or all sides. Therefore, the amount of the fixing grooves 532 will increase. Multi-layers of fixing grooves 532 will be formed in each side.

The fixing hole 533 is used to accommodate the ends of the two end portion fixing tubes 522. Therefore, it can be used to fix the two end portion fixing tubes 522 as well.

As to material, the middle fixing structure 53 can be made by a thermosetting plastic or metal material. For the thermosetting plastic, ABS is better; for the metal material, aluminum or aluminum alloy is preferred.

Each thermal bar 54 is fixed by at least one fixing groove 532. It is used to conduct the heat generated by the rechargeable battery cells 51, via the middle fixing structure 53, out of the rechargeable battery module 50. Heat dissipation can be carried out. In the present embodiment, a cross-sectional shape of the thermal bar 54 is round. Square or hexagonal can be used as well. The thermal bar 54 is made by metal or alloy. Preferably, the metal is aluminum, brass or copper.

The bolt 55 and the nut 56 is used to fix the rechargeable battery module 50. The way of fixing is illustrated in FIG. 4. Two end portion fixing structures 52 are positioned in opposite directions. The bolt 55 pass one 522, the middle fixing structure 53 and the other 522 and fixes the rechargeable battery module 50 by linking with the bolt 55 and the nut 56. The rechargeable battery cells 51 are fixed along an axial direction of the bolt 55 by the limiting structures 5211 of end portion accommodating sections 521 in the two end portion fixing structures 52.

The rechargeable battery module according to the present invention can be linked to a large rechargeable battery module network by sharing thermal bars. Please refer to FIG. 5 and FIG. 6, three rechargeable battery modules 50 use three thermal bars 54 to link laterally and for cooling. Two layers (one in the upper layer and two in the lower layer) are formed in a rechargeable battery module. Also, the application of the present invention can be fulfilled by using three thermal bars 54 to link longitudinally and for cooling (FIG. 7). Two rows (two in the left row and one in the right layer) are formed in a rechargeable battery module.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A rechargeable battery module, comprising:
    a plurality of rechargeable battery cells, each having identical appearance, arranged in the same direction, and connected to each other in series or parallel for providing power;
    two end portion fixing structures, each comprising:
        a plurality of end portion accommodating sections, formed in the same plane, each end portion accommodating section comprising at least one limiting structure, disposed at an end of the end portion accommodating section for accommodating one end of the rechargeable battery cell and limiting movement of the rechargeable battery cell not to go beyond the limiting structure; and
        an end portion fixing tube, formed among the end portion accommodating sections;
    a middle fixing structure, comprising:
        a plurality of hollow portions, formed in the same plane, a cross-sectional shape of each hollow portion is substantially similar and larger than the cross-sectional shape of each of the rechargeable battery cells, for fixing the rechargeable battery cells; and
        a plurality of fixing grooves, each fixing groove formed in one side of the middle fixing structure;
    a plurality of thermal bars, each thermal bar fixed with at least one fixing groove, for conducting heat generated out from the rechargeable battery cells via the middle fixing structure;
    a bolt; and
    a nut,
    wherein, the two end portion fixing structures are positioned in opposite directions, the bolt passes one end portion fixing tube, middle fixing structure and the other end portion fixing tube and fixes the rechargeable battery module by linking with the nut, and the rechargeable battery cells are fixed along an axial direction of the bolt by the limiting structures of the end portion accommodating sections in the two end portion fixing structures.

2. The rechargeable battery module according to claim 1, wherein an end of the end portion accommodating section has an opening to expose an electrode.

3. The rechargeable battery module according to claim 1, wherein the end portion fixing structure further comprises a nut accommodating portion, for accommodating the nut when the bolt is linked to the nut.

4. The rechargeable battery module according to claim 1, wherein the middle fixing structure further comprises a fixing hole, accommodating end portions of the two end portion fixing tubes, for fixing the two end portion fixing tubes.

5. The rechargeable battery module according to claim 1, wherein the end portion fixing structure is made by thermosetting plastic or metal material.

6. The rechargeable battery module according to claim 1, wherein the middle fixing structure is made by thermosetting plastic or metal material.

7. The rechargeable battery module according to claim 1, wherein a cross-sectional shape of the thermal bar is round, square or hexagonal.

8. The rechargeable battery module according to claim 1, wherein the thermal bar is made by metal or alloy.

9. The rechargeable battery module according to claim 8, wherein the metal is aluminum, brass or copper.

* * * * *